June 12, 1956

R. L. PRITCHARD 2,750,453

DIRECT CURRENT AMPLIFIER

Filed Nov 6, 1952

Inventor:
Robert L. Pritchard,
by Paul A. Frank
His Attorney.

United States Patent Office 2,750,453
Patented June 12, 1956

2,750,453

DIRECT CURRENT AMPLIFIER

Robert L. Pritchard, Schenectady, N. Y., assignor to General Electric Company, a corporation of New York Application November 6, 1952, Serial No. 319,080

8 Claims. (Cl. 179—171)

Figure 1:
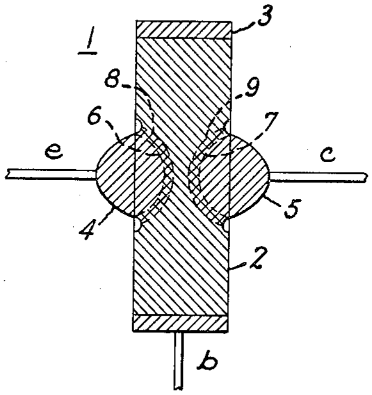

This invention relates generally to direct current amplifying circuits employing junction-type transistors.

Transistors are three-electrode semi-conductive devices generally employing germanium or silicon, which, when they contain certain types of impurity elements, exhibit N or P types of semi-conduction. Crystals of the N type semi-conductor have an excess of electrons or negative current carriers while those of the P type have an excess of positive carriers or "electron holes." A junction transistor, which is of the type of interest with respect to the invention disclosed herein, is a composite semi-conductor comprising a center or base portion of one polarity which is between or adjacent to other zones or portions of the opposite polarity which are respectively called the emitter and collector elements. The junctions between the different elements are rectifying barriers, presenting a low impedance to current flow in the forward direction and a high impedance in the reverse direction. Such junction or broad area contact transistors may be either the P–N–P type or the N–P–N type and have characteristics significantly different from the point contact type of transistor.

Injection of current between one pair of the three electrodes may affect the current flow between another pair of the electrodes in such a way that the transistor may be advantageously employed as an electrical translating device. Outstanding advantages offered by transistors as compared to conventional discharge devices are the reduction in size and in power requirements as well as the elimination of the requirement for filament or heater current. Where a passive input element is employed, such as a resistor whose resistance varies in accordance with an external stimulus, an additional voltage source connected in circuit with the input element is generally required to produce a voltage or current signal whose variation is to be amplified. The provision of such an additional voltage source tends to offset the factors of simplicity and compactness associated with transistor apparatus.

It is an object of my invention to provide a simple and compact amplifier for producing a signal responsive to changes in resistance of an input resistor.

It is another object of my invention to provide a direct current amplifier for producing an amplified current signal corresponding to resistance changes of an input element without requiring a separate signal generating source therefor.

In accordance with one aspect of my invention, a resistor having a resistance value which changes in response to an external stimulus, such as light, temperature, or pressure, is employed as a passive input element in a base input amplifier circuit employing a junction transistor. The amplified output current is suitably employed in an indicating or actuating device for detecting or measuring the external stimulus. A single direct current voltage source is connected in circuit between the emitter collector terminal in series with the load device. No input voltage or bias need be supplied to the amplifier since the single voltage supply serves both to actuate the device represented by the load resistance and to provide a control current in the input circuit that is determined by the input resistance.

Figure 2:
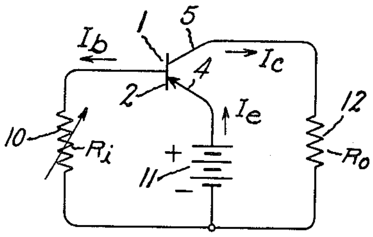
Figure 3:
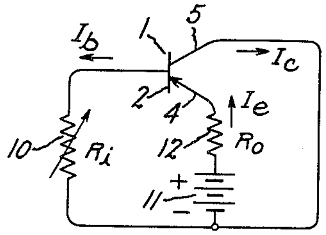
Figure 4:
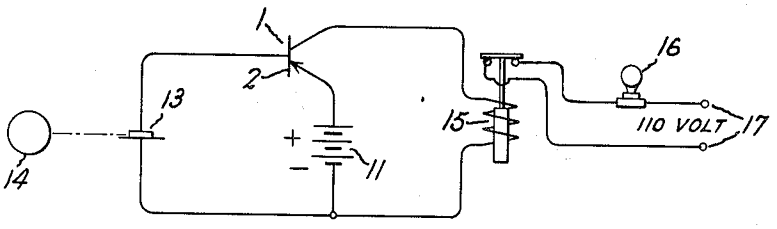

The novel features which are considered to be characteristics of my invention are set forth with particularity in the appended claims. My invention, itself, however, both as to its organization and method of operation, together with further objects and advantages thereof, may best be understood by reference to the following description taken in connection with the accompanying drawing wherein Fig. 1 represents a type of transistor which may be incorporated in circuits embodying my invention; Figs. 2 and 3 are amplifier circuits embodying my invention and Fig. 4 illustrates an application of my invention.

Before proceeding with a detailed description of my invention, itself, reference is made to Fig. 1 which illustrates fused impurity P–N–P junction transistor 1 suitable for use in amplifier circuits incorporating my invention. The base element 2 is a disk or wafer of N type germanium whose outer periphery is engaged by a conductive ring 3 which serves as the base electrode. Small droplets 4 and 5 of an acceptor type of impurity element, such an indium, are respectively fused to opposite faces of the base disk 2 so that the portions 6 and 7 of the germanium disk adjacent the drops contain a diffused concentration of this impurity element. These regions, which are separated by a small thickness of N-type germanium, have strong P type conduction characteristics. In the vicinity of the junctions between the P type and N type regions are rectifying barriers indicated as dotted lines 8 and 9. The droplet 4 comprises the emitter electrode and is associated with the P region 6 and the barrier 8 while the other droplet 5 is the collector and is associated with the P region 7 and barrier 9.

When the P type material is given a positive bias with respect to the N type material on the other side of the P–N junction, the junction is said to be biased in a forward direction for easy flow of current across the barrier. When the polarities are reversed, the junction is biased against the direction of easy flow and a relatively high reverse or back voltage may be applied with only a small current flow. When a forward current is provided between the emitter and base, and an inverse voltage is impressed between the collector and base, the input emitter current changes the resistance of the base collector path in such a way as to increase the collector current from its small initial value. However, the current amplification factor $\alpha$, that is the ratio of collector current change to emitter current change approaches, but is always less than, unity. This characteristic is necessary in amplifier circuits embodying my invention, and for this reason point-contact transistors which have a current amplification factor exceeding unity are not applicable to amplifier circuits embodying my invention. The transistors may also be an N–P–N device, and of course other structural types of junction transistors may be employed.

Referring now to Fig. 2, a P–N–P type transistor 1 corresponding to that of Fig. 1 is employed in a single battery amplifier circuit having a passive input resistor. While in the drawing the symbol for the transistor circuit element may appear to suggest a point contact type, the transistor is of a junction type such as illustrated in Fig. 1. The circuit may be classified as a base-input circuit, and corresponds to the grounded-emitter circuit for alternating current amplification. A passive input resistor 10 whose resistance value $R_i$ is controlled by an external stimulus which it is desired to detect or measure is connected between the base electrode 2 and the negative terminal of a source of undirectional voltage represented by a battery 11 whose positive terminal is connected to the emitter 4. The emitter is thus at a positive voltage with respect to the base to provide a forward bias for easy current flow in the input circuit. The output circuit is completed by a load represented as a resistor 12 connected between the collector electrode 5 and the negative battery terminal. The output load device 12 has a low resistance $R_0$ as compared with that of the input resistance $R_i$. The voltage drop through emitter-base P–N junction is negligible, and by virtue of the polarity of the battery 11, the collector base P–N junction is biased in the inverse or high voltage direction. The output current therefore flows between the emitter and collector to provide a current in the load 12 which is an amplified representation of the current in the input resistor 10. As far as the output circuit between the collector electrode 5 and emitter electrode 4 is concerned, the transistor can be regarded as a pair of diodes connected back-to-back with a forward voltage across the emitter-base diode and an inverse voltage across the collector base diode.

The operation of the amplifier can be fairly easily analyzed. Since the amplifier has both input and output currents flowing in the common emitter, it may be seen that $$I_e=I_b+I_c \quad (1)$$

where $I_e$ is the emitter current, $I_b$ the base current, and $I_c$ the collector current. By definition, $$I_c=\alpha I_e+I_{c0} \quad (2)$$

where $\alpha$ is the current amplification factor previously mentioned and $I_{c0}$ is the back current of the collector-base junction when the emitter current is zero. The transistor employed should preferably have a very small value of $I_{c0}$ since this current is sensitive to temperature changes. Substituting this equation in Equation 1 and solving for $I_e$, $$I_e=\frac{I_b+I_{c0}}{1-\alpha} \quad (3)$$

Substituting this in Equation 1 and solving for $I_c$, $$I_c=\alpha\frac{I_b}{1-\alpha}+\frac{I_{c0}}{1-\alpha} \quad (4)$$

Assuming the voltage drop across the forward biased P–N emitter base junction to be negligible, the base current $$I_b=\frac{E}{R_i} \quad (5)$$

where E is the voltage of the battery 11 and $R_i$ is the resistance of the input resistor 10.

Solving for the output or collector current through the output load device 12, $$I_c=\frac{\alpha}{1-\alpha}\frac{E}{R_i}+\frac{I_{c0}}{1-\alpha} \quad (6)$$

Since $\alpha$ is slightly less than unity the current gain over that obtained if the transistor were not connected in circuit with the input resonator and battery is a substantial number of times the current through the input resistor, the gain increasing as the factor $\alpha$ approaches unity. With a value of $\alpha$ equaling, for example, 0.95, the gain factor is approximately 19. It should be noted, however, that this relationship is valid only over a limited range of base currents since the collector or output current is ultimately limited to $E/R_0$. The output current to input resistance relationship, is, however, substantially linear up to the maximum current limit.

Fig. 3 shows a similar base input amplifier arranged with the load device connected in the emitter branch, similar to the grounded-collector circuit for alternating current amplification. Accordingly, the circuit elements correspond to those of Fig. 2 except that the load device 12 is connected in series with the voltage source 11 between the emitter terminal 4 and the common connection to the collector 5 and the input resistor 10. The gain is somewhat greater than in Fig. 2. This follows since the load current is the sum of the input and output currents, and an analysis of the circuit shows that $$I_L=\frac{1}{1-\alpha}I_b+\frac{I_{c0}}{1-\alpha} \quad (7)$$

This indicates that the current gain is greater than in the circuit of Fig. 2. However, for values of $\alpha$ close to unity, where the gain is maximum, there is very little difference between the gains of the two circuits. Since, in the case of Fig. 3, $$I_b=\frac{E}{R_i+R_0}$$

the resistance of $R_0$ should be small relative to $R_i$ to avoid undue loss of sensitivity. The choice of circuits depends to some extent upon the resistance characteristic of the input element 10 and the relative resistances of the input and load devices.

Fig. 4 is illustrative of an application of my invention, the circuit employed being the base input arrangement of Fig. 2. In this circuit the passive input device is a photosensitive element 13 whose resistance varies in accordance with the amount of light received from a light source 14. Various photosensitive elements known in the art may be employed, a cadmium sulfide crystal representing one of the types having a resistance range well suited to this type of circuit. The transistor 1 may suitably be the fused-impurity type illustrated in Fig. 1 and the output load device is a relay 15 whose energizing coil is connected in the transistor amplifier output circuit. A switch actuated by the relay closes a circuit including a lamp 16 and a lamp voltage source 17 when the input resistance indicates a certain deficiency from the light source 14. It is obvious, of course, that many other types of passive input elements responsive to various stimuli may be employed, such as, for example, elements having their resistance dependent upon temperature or pressure. Similarly, the output load devices may be indicating devices or actuating means for feedback control as desired.

While the present invention has been described by reference to particular embodiments thereof, it will be understood that numerous modifications may be made by those skilled in the art without actually departing from the invention. I, therefore, aim, in the appended claims to cover all such equivalent variations as come within the true spirit and scope of the foregoing disclosure.

What I claim as new and desire to secure by Letters Patent of the United States is:

1. An amplifier comprising a passive input device having a resistance value controlled by an external stimulus, a junction type transistor having base, emitter, and collector elements, an output load device having a resistance which is low relative to that of the input device, and a single unidirectional voltage source, said input device being connected between said base and emitter elements through said voltage source and said load device being connected between said emitter and said collector through said voltage source.

2. A current amplifier circuit comprising a junction transistor having base, emitter, and collector elements, a base input circuit comprising a passive input device having a resistance subject to an external stimulus and a single source of unidirectional voltage coupled between the base and the emitter, and an emitter-to-collector output circuit comprising an output device and said single source of unidirectional voltage.

3. A current amplifier circuit comprising a transistor having a collector-base to emitter-base current amplification factor less than unity, a base input circuit comprising a passive input device having a resistance subject to an external stimulus and a single source of unidirectional voltage coupled between the base and the emitter, and an emitter-to-collector output circuit comprising an output device and said single source of unidirectional voltage, said source being polarized to provide a forward voltage between the emitter and base and an inverse voltage between the base and collector.

4. A current amplifier circuit comprising a junction transistor having base, emitter, and collector elements, an output circuit comprising a load device and a source of output voltage connected in circuit between said emitter and said collector to place a forward bias between the emitter and base and a reverse bias between the base and collector, and an input circuit comprising a passive input device having a resistance subject to an external stimulus, connected between the base and a junction in said output circuit whereby the output voltage source also serves to provide an input current in said input circuit.

5. A current amplifier circuit comprising a junction transistor having base, emitter, and collector elements, a passive input device having a resistance subject to an external stimulus connected between the base element and a reference junction, an output device having a resistance which is low relative to that of said input device connected between the collector element and said reference junction and a single source of unidirectional voltage connected between the emitter element and said reference junction.

6. A current amplifier circuit comprising a junction transistor having base, emitter, and collector elements, a passive input device having a resistance subject to an external stimulus and a single source of voltage connected between said base and collector elements, an output device having a resistance which is low relative to that of said input device and said single source of voltage connected in series between said emitter and said collector elements.

7. An amplifier comprising a passive input device having a resistance value controlled by an external stimulus, a transistor having a current amplification factor less than unity, a base, emitter, and collector elements, an output load device having a resistance which is low relative to that of the input device, and a single unidirectional voltage source, said input device being connected between said base and emitter elements through said voltage source and said load device being connected between said emitter and said collector through said voltage source.

8. An amplifier comprising a passive input device having a resistance value controlled by an external stimulus, a transistor having a current amplification factor less than unity over the direct current operating voltage range, a base, emitter, and collector elements, an output load device having a resistance which is low relative to the resistance of the input device, and a single unidirectional voltage source, said input device being connected between said base and emitter elements through said voltage source and said load device being connected between said emitter and said collector through said voltage source.

References Cited in the file of this patent

UNITED STATES PATENTS

| | | |
|---|---|---|
| 2,609,459 | Bergson | Sept. 2, 1952 |
| 2,647,958 | Barney | Aug. 4, 1953 |
| 2,663,806 | Darlington | Dec. 22, 1953 |

OTHER REFERENCES

Webster et al.: RCA Review, March 1949, pp. 5–16.